(12) United States Patent
Darling et al.

(10) Patent No.: US 6,448,344 B1
(45) Date of Patent: Sep. 10, 2002

(54) FUNCTIONAL POLYMERS BEARING NON-METAL OXYACID DERIVATIVES ON DIMETHYLENE SPACES

(75) Inventors: Graham D. Darling, Russell; Brent R. Stranix, Point-Claire, both of (CA)

(73) Assignee: Active Materials, Inc., Ottawa (CA)

( * ) Notice: Subject to any disclaimer, the term of this patent is extended or adjusted under 35 U.S.C. 154(b) by 103 days.

(21) Appl. No.: 09/634,020

(22) Filed: Aug. 8, 2000

Related U.S. Application Data

(63) Continuation of application No. PCT/CA98/01088, filed on Nov. 27, 1998.

(51) Int. Cl.[7] .................................................. C08F 8/40

(52) U.S. Cl. .................... 525/332.2; 525/340; 525/343; 525/353

(58) Field of Search .............................. 525/332.2, 340, 525/343, 353

(56) References Cited

U.S. PATENT DOCUMENTS

| | | | |
|---|---|---|---|
| 3,857,823 A | | 12/1974 | Ackerman |
| 3,884,882 A | | 5/1975 | Caywood, Jr. |
| 4,575,541 A | | 3/1986 | Carpino et al. |
| 4,654,267 A | | 3/1987 | Ugelstad et al. |
| 4,950,712 A | | 8/1990 | Letourneur et al. |
| 5,019,269 A | | 5/1991 | Letourneur et al. |
| 5,350,523 A | * | 9/1994 | Tomoi et al. ............... 521/32 |
| 5,414,094 A | | 5/1995 | Csapilla |

FOREIGN PATENT DOCUMENTS

| | | | |
|---|---|---|---|
| EP | 0 274 998 A2 | | 7/1988 |
| EP | 0 274 999 A2 | | 7/1988 |
| EP | 0 304 377 A2 | | 2/1989 |
| EP | 0 461 822 A2 | | 12/1991 |
| EP | 0 500 239 A1 | | 2/1992 |
| EP | 0 496 513 A2 | | 7/1992 |
| EP | 0 500 239 A1 | | 8/1992 |
| EP | 0 152 780 A2 | | 8/1995 |
| GB | 2 018 786 A | | 10/1979 |
| WO | WO 95/34813 | | 12/1995 |
| WO | WO 96/08949 A2 | | 3/1996 |
| WO | WO 96/18592 | | 6/1996 |
| WO | WO 97/05175 | * | 2/1997 |

OTHER PUBLICATIONS

Alexandratos, S. et al., "Mechanism of Polymer–Based Separations. II. Targeted Metal Ion Complexation By Reactive Polymers", *Reactive Polymers*, 13:255–265 (1990).

Bartholin, M. et al., "Revisted IR Analysis", *Makromol Chem.*, 182: 2075 (1981).

Brunelet, T. et al., "Functionalized Resins, 2", *Die Angewandte Makromolekulare Chemie*, 106: 79–90 (1982).

Darling, G. et al., "Dimethylene Spacers in Functionalized Polystyrenes", *Chemical Reactions on Polymers*, 24–36 (1988).

Deratani, A. et al., "Heterocyclic Polymers as Catalysts in Organic Synthesis. Effect of macromolecular Design and Microenvironment on the Catalytic Activity of Polymer–Supported (Dialkylamino)pyridine Catalysts", *Macromolecular*, 20:767–772 (1987).

Faber, M.C. et al., "Polymer–bound Thiamine Models. IV. A simple Synthetic Route To Immobilize A Thiazolium Salt To Macroreticular Polystryene Resins Via A Dimethylene Spacer", *Reactive Polymers*, 11: 117–126 (1989).

Farall, M. et al., "Chemically modified polystyrene containing pendant vinyl groups: a photosensitive polymer exhibiting chemical amplification", *Polymer*, 24: 114–116 (1983).

Gao, J. et al., "Functional Polymers Containing Dimethylene Spacers. Characterization by Solid–Phase $^{13}$C–NMR", *Macromolecules*, 26: 1196–1198 (1993).

Nagasaki, Y. et al., "Soluble poly(divinylbenzene): Reaction mechanism for the anionic polymerization of divinylbenzene with lithium diisopropylamide as catalyst" *Makromol. Chem.*, 187: 23–27 (1986).

(List continued on next page.)

*Primary Examiner*—Bernard Lipman
(74) *Attorney, Agent, or Firm*—Scully, Scott, Murphy & Presser

(57) ABSTRACT

A functional polymer having active and stable functional groups, for separation or reactive processes in chemical manufacture or analysis, bears nonmetal oxyacid derivatives on dimethylene spacers; a method of preparation is from pre-existing polymers comprising polymeric 1-(vinylphenyl)ethylene repeat units, including radial copolymers of divinylbenzene, by treating with $HX(O)_m R^1_n R^2$ in presence of free radicals; another method of preparation is by treating a polymer comprising repeat units of the form —CH[Ph—CH$_2$CH$_2$—X(O)$_m$R$^1_n$R$^2$]—CH$_2$— where X is of lower oxidation state, with oxidizing agent so as to oxidize X to a higher oxidation state; another method of preparation is to exchange one or both of R$^1$ and R$^2$ substituents in —CH[Ph—CH$_2$CH$_2$—X(O)$_m$R$^1_n$R$^2$]—CH$_2$— with other substituents; other functional groups may be present; the functional polymer comprises repeat units of the form —CH[Ph—CH$_2$CH$_2$—X(O)$_m$R$^1_n$R$^2$]—CH$_2$—, in which X may be S with m=2 and n=0, or P with m=1 and n=1, R$^1$ may be Cl, Br, O—, OH, R$^3$, OR$^3$, NH$_2$, NHR$^3$, NR$^3$R$^4$ and NR$^5$R$^6$, and R$^2$ may be Cl, Br, O—, OH, OR$^7$, NH$_2$, NHR$^7$, NR$^7$R$^8$ and NR$^9$R$^{10}$, wherein R$^3$, R$^4$, R$^7$, and R$^8$ are selected from methyl, ethyl, n-propyl, i-propyl, n-butyl, i-butyl, s-butyl, t-butyl, 2-ethylhexyl, hexadecyl, 2-chloroethyl, 2-bromoethyl, 2,2,2-trifluoroethyl, 2-hydroxyethyl, 2-butoxyethyl, 2-aminoethyl, cyclohexyl, phenyl, benzyl, 4-nitrobenzyl, tolyl, a polypeptide, a polysaccharide and a polynucleotide, and R$^5$, R$^6$, and R$^9$ and R$^{10}$ are selected from cyclic —(CH$_2$)$_q$— wherein q is selected from 2 to 5; polymer-bound functional groups are afforded that are sulfonic acid, sulfonate salt, sulfonate ester, sulfonamide, sulfonyl halide, phosphonic acid, phosphonate salt, phosphonyl halide, phosphonate ester or phosphonamide, or combinations thereof.

8 Claims, 1 Drawing Sheet

OTHER PUBLICATIONS

Sherington, D.C. et al., "Synthesis and Structure of Polymer Supports" *Synthesis and Separation Using Functional Polymers,* pp. 1–3, 43–125, 149–151, 181–183, 209–211, 227–229, 265–267, 305–307, 325–327, 387–389 (1988).

Obrecht, W. et al., "Reaktive Mikrogele, 5*)", *Makromol. Chem.,* 177:2235–2240 (1976).

Stacey, F.W. et al., "Formation of Carbon–Hetero Atom Bonds By Free Radical Chain Additions To Carbon–Carbon Multiple Bonds", *Carbon–Hetero Atom Bonds By Radical Additions,* pp. 150–225 (1963).

Stranix, B.R. "Functional Polymers from (Vinyl)polystyrene. Solid–phase Reagents, Catalysts, Supports and Fluorescent Sensors.", (Thesis), (1997).

Stranix, B.R. et al., "Functional Polymers from (Vinyl)polystyrene. Short Routes to Binding Functional Groups to Polystyrene Resin through a Dimethylene Spacer, Bromine, Sulfur, Phosphorus, Silicon, Hydrogen, Boron, and Oxygen", *J. Org. Chem.,* 62:8987–8993 (1997).

Viklund, C. et al., "Monolithic, "Molded", Porous Materials with High Flow Characteristics for Separations, Catalysis, or Solid–Phase Chemistry: Control of Porous Properties during Polymerization", *Chem. Mater.,* 8: 744–750 (1996).

Yamamizu, T. et al., "A New Styrene Derivative and its Application to Reactive polymer Synthesis", *Reactive Polymers,* 3: 173–179 (1985).

Zhengpu, Z. et al., "Reactions of Benzaldehyde with Diethylzinc Catalysed by a Novel Type of Polymer–Supported N–Benzyl–or N–Alkyl–(1S,2R)–Ephedrines", *Reactive Polymers,* 15: 71–77 (1991).

* cited by examiner

FUNCTIONAL POLYMERS BEARING NON-METAL OXYACID DERIVATIVES ON DIMETHYLENE SPACES

RELATED APPLICATIONS

This application is a continuation application of co-pending international application no. PCT/CA98/01088 filed Nov. 27, 1998.

TECHNICAL FIELD

This invention relates to a functional polymer comprising active and stable functional groups, and to a method of preparing the same. More particularly, the present invention relates to a functional polymer bearing nonmetal oxyacid derivatives on dimethylene spacers, comprising repeat units that are of the form —CH[Ph—CH$_2$CH$_2$—X(O)$_m$R$^1{}_n$R$^2$]—CH$_2$— wherein X(O)$_m$R$^1{}_n$R$^2$ is a nonmetal oxyacid derivative, and to methods of its preparation.

BACKGROUND ART

Functional polymers are widely used in industry as separation media and as solid-phase reagents, catalysts and protecting groups for analytical or preparative chemical applications and processes [D. C. Sherrington and P. Hodge, "Syntheses and Separations Using Functional Polymers", John Wiley & Sons, Toronto, 1988]. A functional polymer generally consists of a polymer matrix, in the form of particles, beads or a porous block [C. Viklund, F. Svek, J. M. J. Fréchet and K. Irgum, "Molded porous materials with high flow characteristics for separation or catalysis: control of porous properties during polymerization in bulk solution", Chem. Mater. y1986 v8 p744–750], that is chemically inert to the conditions of its use, including being insoluble in any solvent it is likely to encounter so that it can be retained in a column or easily recovered from out of a product mixture by filtration or other separation for easy isolation of chemical product and reuse of the functional polymer; and also of functional groups, attached to the polymer matrix, that can bind, transform or otherwise interact with chemical species that are dissolved in a permeating fluid, or that confer other advantageous properties to the functional polymer, such as a higher density for best use in floating bed reactors or for easier and faster separation by precipitation, or better wetting and penetration by a particular solvent. Most often, the polymer matrix is of crosslinked polystyrene, due to the ease of its preparation through suspension or other polymerization of styrene or styrene-like monomer (usually, including divinylbenzene as crosslinking agent), with attendant control of particle size, porosity, swellability, surface area, and other aspects of its architecture affecting eventual use; and its good general mechanical and chemical stabilities, though also with the ability to be controllably decorated with any of a wide variety of functional groups. In ion exchange resins, which are manufactured in large quantities for deionizing water and many other purification processes, these functional groups may consist of sulfonic, carboxylic, phosphinic or phosphonic acids or phosphonic ester acids or their salts, or amines or their salts, or quaternary ammonium or phosphonium hydroxides or other of their salts; recoverable solid resins for general acid catalysis would bear sulfonic or phosphoric strong acid groups; chelating resins that recover toxic or expensive metal ions from wastewater may contain combinations of amino and sulfonate, phosphinate, phosphonate [S. D. Alexandratos, and D. R. Quillen, Reactive Polym. y1990 v12 p255–265] or carboxylate groups, along with hydroxyl, ether, thiol, sulfide, phosphine, phosphoramidate or other Lewis base groups; certain of these groups may also coordinate with metal ions to activate their negative counterions for phase-transfer catalyzed nucleophilic substitution or other reactions, or may hold platinum or other catalytic heavy metal species so that these are conserved and re-used from one reaction to the next; halosilyl, haloalkyl, haloacyl, halophosphinyl, halophosphonyl or halosulfonyl functional groups, or anhydride or azlactone functional groups, can covalently bind to other organic molecules so that parts of these are protected while other parts are being chemically modified, the whole later released, such as in solid-phase synthesis of polypeptides, polysaccharides or polynucleotides or themselves act as agents for catalysis or molecular recognition, as with proteinic enzymes, antibodies or antigens that have been polymer-bound. Phosphorus-containing functional groups can improve fire resistance sorption in a functional polymer.

While functional polymers may be prepared by polymerization of monomers that already contain the desired functional groups, more commonly they are made by chemically functionalizing or modifying other existing polymer matrices—most commonly, crosslinked polystyrene—as prepared from common monomers through established polymerization recipes that give well-defined and desirable particle and matrix structures and properties. However, existing such modification methods of preparing functional polymers often suffer from disadvantages of hazardous or expensive ingredients or conditions, that result in products that are intrinsically deficient in activity or stability or both [G. D. Darling and J. M. J. Fréchet "Dimethylene spacers in functionalized polystyrenes", in J. L. Benham and J. F. Kinstle, Eds. "Chemical Reactions on Polymers", ACS Symp. Ser. v364, American Chemical Society, Washington D.C., y1988 p24–36]. For example, the chloromethylation route to the most common anion-exchange and chelating polystyrene-based resins uses or generates highly carcinogenic species, and results in benzyl-heteroatom bonds that are unstable to many conditions of eventual use or regeneration; bromination/lithiation, another general route to functional polymers, employs expensive and sensitive organometallic reagents and, like sulfonation, results in aryl-heteroatom functional groups that may be unstable in acidic conditions. Functional polymers containing aliphatic spacer groups of at least two carbons between polystyrene phenyl and functional group heteroatom would not show either type of chemical instability, and moreover, the deeper penetration of the dangling functional groups into a fluid phase permeating the polymer matrix often allows better and faster interactions with soluble species therein [A. Deratani, G. D. Darling, D. Horak and J. M. J. Fréchet "Heterocyclic polymers as catalysts in organic synthesis. Effect of macromolecular design and microenvironment on the catalytic activity of polymer-supported (dialkylamino)pyridine catalysts." Macromolecules y1987 v20 p767]. Several such spacer-containing functional polymers have been prepared via electrophilic aromatic substitution—either chloromethylation or bromination/lithiation—of aryl nuclei in crosslinked styrene-divinylbenzene copolymer, albeit through tedious multistep syntheses [Darling and Fréchet y1988 ibid].

Instead of on styrenic phenyl, modification reactions can be performed on the vinyl groups of polymeric 1-(vinylphenyl)ethylene repeat units. These vinyl groups may be prepared from formyl, chloromethyl, bromoethyl or 1,2-dibromoethyl functional group precursors [M. J. Farrell, M. Alexis and M. Trecarten, Polymer y1983 v24 p114; Darling and Fréchet y1988 ibid; T. Yamamizu, M. Akiyama and K. Takeda, React. Polym. y1985 v3 p173], or remain from anionic [Y. Nagasaki, H. Ito, T. Tsuruta, Makromol. Chem. y1968 v187 p23] or even free-radical [M. C. Faber, H. J. van den Berg, G. Challa and U. K. Pandit, React. Polym. y1989 v11 p117] copolymerization of monomer mixtures that include divinylbenzene. Radial copolymerization with divinylbenzene is a particularly simple way to form a polymer that contains such vinyls, that moreover have here the advantage of being site-isolated; indeed, Rohm and Haas supplies a commercial product, "Amberlite® XAD-4 nonionic polymeric adsorbent", which analysis thereof indicates to be undoubtedly made by radical copolymerization of a mixture of divinylbenzene and ethylstyrene—which mixture, containing both meta and para isomers of each, is commercially provided under the name "technical-grade divinylbenzene" ["Aldrich Catalog" y1997], and so which resulting polymer may be called "poly(divinylbenzene)"—and which contains 30 mol % of polymeric 1-(vinylphenyl)ethylene repeat units, with the remaining repeat units consisting of polymeric 1-(ethylphenyl)ethylene and crosslinking polymeric bis (ethylene)phenyl repeat units [Faber et al y1989 ibid]. Through electrophilic, nucleophilic, radical, transition-metal catalyzed or other additions to such polymeric 1-(vinylphenyl)ethylene repeat units. [W. Obrecht, Y. Seitz and W. Funke, Makromol. Chem. y1976 v177 p2235; Faber et al y1989 ibid; Z. Zhengpu, P. Hodge and P. W. Stratford, React. Polym. y1991 v15 p71; J. P. Gao, F. G. Morin and G. D. Darling, Macromolecules y1993 v26 p1196], or by their radical-induced graft copolymerizations with various monomers [T. Brunelet, M. Bartholin and A. Guyot, Angew. Makromol. Chem. y1982 v106 p79], have been provided a wide variety of functional groups, including of the form Ps—$CH_2$—$CH_2$—X, wherein Ps represents a crosslinked polystyrene matrix connecting through phenyl, and X a functional group connecting through a heteroatom, that features advantageous dimethylene spacer [Gao et al y1993 ibid].

Useful functional groups that are derivatives of nonmetal oxyacids such as sulfonate or phosphonate may be incorporated into functional polymers through polymerizations with such comonomers as vinylsulfonate, vinylphosphonate, vinylphenylsulfonate or vinylphenylphosphonate. As previously mentionned though modification of an existing optimal polymer matrix is a route often to be preferred for its simplicity, versatility, economy and better product properties. Though aryl sulfonation of crosslinked polystyrene and its product Ps—$SO_3H$ are well known, and nucleophilic substitution of Ps—$CH_2$—Cl has provided Ps—$CH_2$—$SO_3^-$, Ps—$CH_2$—$PO(OCH_3)_2$ and other polymer-supported nonmetal oxyacid derivatives of general form Ps—$CH_2$—X, as well as Ps—$CH_2$—$CH(PO(OCH_3))_2$ via similar nucleophilic substitution by methylene bis(dimethylphosphonate) anion onto Ps—$CH_2$—Cl, the prior art does not contain a functional polymer bearing acid, salt, ester, halo or amide derivatives of nonmetal oxyacid on dimethylene spacers, of general form Ps—$CH_2CH_2$—X wherein Ps represents a crosslinked polystyrene matrix connecting through phenyl, and X a nonmetal oxyacid functional group connecting through a nonmetal atom such as S or P of oxidation state >0, nor have methods been described for their preparation, including by radical additions to 1-(vinylphenyl)ethylene repeat units, oxidation of other Ps—$CH_2CH_2$—X wherein X is a functional group connecting through a nonmetal atom of lower oxidation state, or by protonation, deprotonation or exchange of substituents on the connecting oxidized nonmetal atom of the forementionned nonmetal oxyacid derivative X.

OBJECTS OF THE INVENTION

It is an object of this invention to provide a functional polymer bearing nonmetal oxyacid derivatives on dimethylene spacers for separation or reactive processes in chemical manufacture or analysis.

It is another object of this invention to provide a functional polymer that can be prepared using readily-available materials and simple conditions and apparatus.

It is another object of this invention to provide a functional polymer, the architecture of whose polymer matrix (e.g. particle size and shape, porosity, swellability, surface area), and type, arrangement and number of whose functional groups, can be controlled.

It is another object of this invention to provide a functional polymer whose functional groups are stable, active, and accessible to a permeating fluid.

It is another object of this invention to provide a functional polymer bearing functional groups that are sulfonic acid, sulfonate salt, sulfonate ester, sulfonamide, sulfonyl halide, phosphonic acid, phosphonate salt, phosphonyl halide, phosphonate ester or phosphonamide, or combinations thereof, in type, arrangement and number sufficient to confer or contribute towards acidity, basicity, ion exchange, fire-resistance, wettability, chelation, extraction, separation, sorption, density, permeability, catalysis, selectivity, hydrophilicity, reactivity, seperability, suspendability, binding of ions, binding of organic molecules, binding of polypeptides, binding of polysaccharides, binding of polynucleotides, molecular recognition, filterability, convertability to other functional groups, or other desirable qualities, or combinations thereof, in a separation medium, chromatographic medium, purification medium, ion-exchange medium, chelating medium, solid-phase reagent, solid-phase catalyst, solid-phase protecting agent, support for solid-phase synthesis, chemical intermediate, or other application of a functional polymer, or combinations thereof.

SUMMARY OF THE INVENTION

In accordance with the invention there is provided a functional polymer bearing nonmetal oxyacid derivatives on dimethylene spacers, comprising repeat units of the form —CH[Ph—$CH_2CH_2$—$X(O)_m R^1_n R^2$]—$CH_2$—, wherein X is selected from nonmetals S and P, m is selected from 2 with X=S, or from 1 with X=P, $R^1$ is selected from Cl, Br, $O^-$, OH, $R^3$, $OR^3$, $NH_2$, $NHR^3$, $NR^3R^4$ and $NR^5R^6$ with X=P, n is selected from 0 with X=S, or from 1 with X=P, $R^2$ is selected from Cl, Br, $O^-$, OH, $OR^7$, $NH_2$, $NHR^7$, $NR^7R^8$ and $NR^9R^{10}$, wherein $R^3$, $R^4$, $R^7$ and $R^8$ are selected from methyl, ethyl, n-propyl, i-propyl, n-butyl, i-butyl, s-butyl, t-butyl, 2-ethylhexyl, hexadecyl, 2-chloroethyl, 2-bromoethyl, 2,2,2-trifluoroethyl, 2-hydroxyethyl, 2-butoxyethyl, 2-aminoethyl, cyclohexyl, phenyl, benzyl, 4-nitrobenzyl, tolyl, a polypeptide, a polysaccharide and a polynucleotide, and $R^5$, $R^6$, $R^9$ and $R^{10}$ are selected from cyclic —$(CH_2)_q$— where q is selected from 2 to 5.

In accordance with another aspect of the invention, there is provided a provided a functional polymer that can be prepared by reacting a pre-existing polymer comprising polymeric 1-(vinylphenyl)ethylene repeat units with a compound $HX(O)_m R^1_n R^2$ in the presence of free radicals.

In accordance with another aspect of the invention, there is provided a provided a functional polymer that can be prepared by reacting a pre-existing polymer comprising repeat units of the form —CH[Ph—$CH_2CH_2$—

$X(O)_m R^1{}_n R^2$]—$CH_2$— wherein X is of a lower oxidation state with oxidizing agent so as to oxidize X to a higher oxidation state.

In accordance with another aspect of the invention, there is provided a functional polymer that can be prepared by reacting a pre-existing polymer comprising repeat units of the form —CH[Ph—$CH_2CH_2$—$X(O)_m R^1{}_n R^2$]—$CH_2$— with reagents and conditions so as to transform substituent $R^1$ to a different substituent $R^{11}$ or substituent $R^2$ to a different $R^{12}$ or both.

In accordance with a preferred embodiment of the invention there is provided a method of preparing a functional polymer bearing nonmetal oxyacid derivatives on dimethylene spacers, by treating a polymer that comprises polymeric 1-(vinylphenyl)ethylene repeat units with a compound $HX(O)_m R^1{}_n R^2$ dissolved in a fluid that permeates said polymer, in the presence of other compounds and under such conditions that radicals are generated in the medium, and the $HX(O)_m R^1{}_n R^2$ undergoes radical-induced addition to the 1-(vinylphenyl)ethylene repeat units.

In accordance with a preferred embodiment of the invention there is provided a functional polymer bearing nonmetal oxyacid derivatives on dimethylene spacers that has been prepared by treating polymeric 1-(vinylphenyl)ethylene repeat units with a compound $HX(O)_m R^1{}_n R^2$ in the presence of free radicals.

In accordance with a preferred embodiment of the invention there is provided a method of preparing a functional polymer bearing nonmetal oxyacid derivatives on dimethylene spacers, by treating a pre-existing polymer comprising repeat units of the form —CH[Ph—$CH_2CH_2$—$X(O)_m R^1{}_n R^2$]—$CH_2$— wherein X is of a lower oxidation state with peracetic acid or other oxidizing agent dissolved in a fluid that permeates said polymer, under such conditions so as to oxidize X to a higher oxidation state.

In accordance with a preferred embodiment of the invention there is provided a functional polymer bearing nonmetal oxyacid derivatives on dimethylene spacers that has been prepared by treating a pre-existing polymer comprising repeat units of the form —CH[Ph—$CH_2CH_2$—$X(O)_m R^1{}_n R^2$]—$CH_2$— wherein X is of a lower oxidation state oxidizing agent so as to oxidize X to a higher oxidation state.

In accordance with a preferred embodiment of the invention there is provided a method of preparing a functional polymer bearing nonmetal oxyacid derivatives on dimethylene spacers, by treating a pre-existing polymer comprising repeat units of the form —CH[Ph—$CH_2CH_2$—$X(O)_m R^1{}_n R^2$]—$CH_2$— with reagents dissolved in a fluid permeating said polymer, under such conditions as to transform substituent $R^1$ to a different substituent $R^{11}$ or substituent $R^2$ to a different substituent $R^{12}$ or both.

In accordance with a preferred embodiment of the invention there is provided a functional polymer bearing nonmetal oxyacid derivatives on dimethylene spacers that has been prepared by treating a pre-existing polymer comprising repeat units of the form —CH[Ph—$CH_2CH_2$—$X(O)_m R^1{}_n R^2$]—$CH_2$— with reagents and under conditions as to transform substituent $R^1$ to a different substituent $R^{11}$ or substituent $R^2$ to a different substituent $R^{12}$ or both.

In accordance with a preferred embodiment of the invention there is provided a functional polymer bearing nonmetal oxyacid derivatives on dimethylene spacers comprising repeat units of the form —CH[Ph—$CH_2CH_2$—$SO_2R^2$]—$CH_2$— wherein $R^2$ is selected from OH and $O^-$.

In accordance with a preferred embodiment of the invention there is provided a method of preparing a functional polymer comprising repeat units of the form —CH[Ph—$CH_2CH_2$—$SO_2O^-$]—$CH_2$—, by reacting a pre-existing polymer comprising polymeric 1-(vinylphenyl)ethylene repeat units with $HSO_3^-$ in the presence of free radicals.

In accordance with a preferred embodiment of the invention there is provided a method of preparing a functional polymer comprising repeat units of the form —CH[Ph—$CH_2CH_2$—$SO_2OH$]—$CH_2$—, by reacting a pre-existing polymer comprising polymeric repeat units of the form —CH[Ph—$CH_2CH_2$—$SCOCH_3$]—$CH_2$— with peracetic acid in acetic acid.

In accordance with a preferred embodiment of the invention there is provided a functional polymer comprising repeat units of the form —CH[Ph—$CH_2CH_2$—$P(O)R^1R^2$]—$CH_2$— wherein $R^1$ and $R^2$ are selected from OH, $O^-$ and $OCH_3$.

In accordance with a preferred embodiment of the invention there is provided a method of preparing a functional polymer comprising repeat units of the form —CH[Ph—$CH_2CH_2$—$P(O)(OCH_3)_2$]—$CH_2$—, by reacting a pre-existing polymer comprising polymeric 1-(vinylphenyl)ethylene repeat units with dimethylphosphite in the presence of free radicals.

In accordance with a preferred embodiment of the invention there is provided a method of preparing a functional polymer comprising repeat units of the form —CH[Ph—$CH_2CH_2$—$P(O)R^2$]—$CH_2$— wherein $R^2$ is selected from OH and $OCH_3$, by reacting a pre-existing polymer comprising repeat units of the form —CH[Ph—$CH_2CH_2$—$P(O)(OCH_3)_2$]—$CH_2$— with aqueous acid under conditions so as to replace some $OCH_3$ by OH.

In accordance with a preferred embodiment of the invention there is provided a functional polymer bearing nonmetal oxyacid derivatives on dimethylene spacers that has been prepared from a radical copolymer polymer of monomers comprising divinylbenzene.

In accordance with a preferred embodiment of the invention there is provided a functional polymer bearing nonmetal oxyacid derivatives on dimethylene spacers that has been prepared from a radical copolymer of monomers consisiting of meta-divinylbenzene and para-divinylbenzene and meta-ethylstyrene and para-ethylstyrene.

In accordance with a preferred embodiment of the invention there is provided a functional polymer bearing nonmetal oxyacid derivatives on dimethylene spacers that also comprises other functional groups.

In accordance with a preferred embodiment of the invention there is provided a functional polymer bearing nonmetal oxyacid derivatives on dimethylene spacers, said nonmetal oxyacid derivatives being or bearing functional groups that are sulfonic acid, sulfonate salt, sulfonate ester, sulfonamide, sulfonyl halide, phosphonic acid, phosphonate salt, phosphonyl halide, phosphonate ester or phosphonamide, or combinations thereof, in type, arrangement and number sufficient to confer or contribute towards acidity, basicity, ion exchange, fire-resistance, wettability, chelation, extraction, separation, sorption, density, permeability, catalysis, selectivity, hydrophilicity, reactivity, seperability, suspendability, binding of ions, binding of organic molecules, binding of polypeptides, binding of polysaccharides, binding of polynucleotides, molecular recognition, filterability, convertability to other functional groups, or other desirable qualities, or combinations thereof, in a separation medium, chromatographic medium, purification medium, ion-exchange medium, chelating medium, solid-phase reagent, solid-phase catalyst, solid-phase protecting agent, support for solid-phase synthesis, chemical intermediate, or other application of a functional polymer, or combinations thereof.

BRIEF DESCRIPTION OF THE DRAWINGS

In drawings of preferred embodiments of the invention.

DESCRIPTION OF PREFERRED EMBODIMENTS

Figure 1:
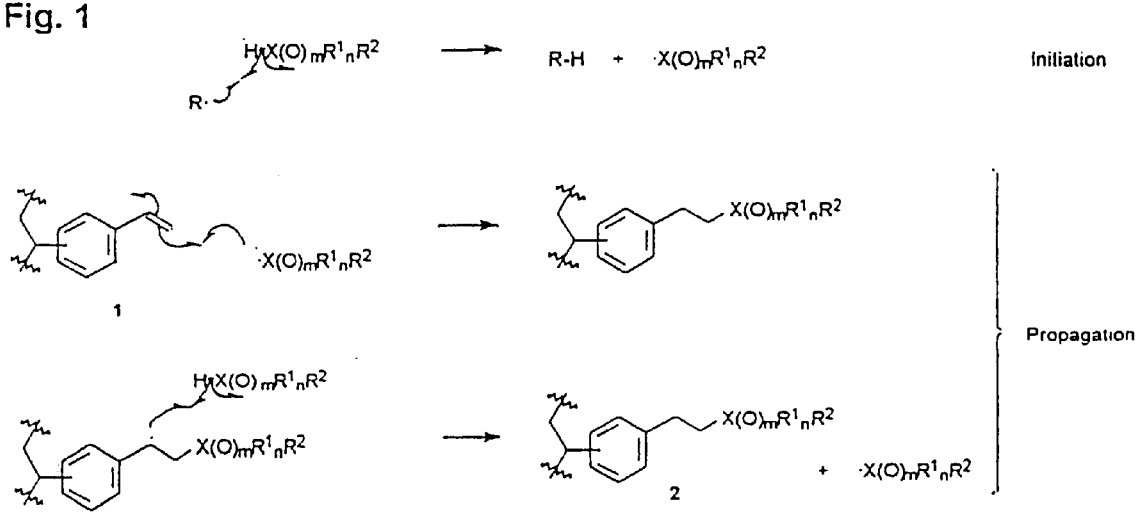
FIG. 1 shows a mechanism of formation of —CH[Ph—CH$_2$CH$_2$—X(O)$_m$R$^1_n$R$^2$]—CH$_2$— repeat units of an embodiment of the invention 2, by anti-Markovnikov addition of HX(O)$_m$R$^1_n$R$^2$ to 1-(vinylphenyl)ethylene repeat units of 1 in the presence of free radicals R.
Figure 2:
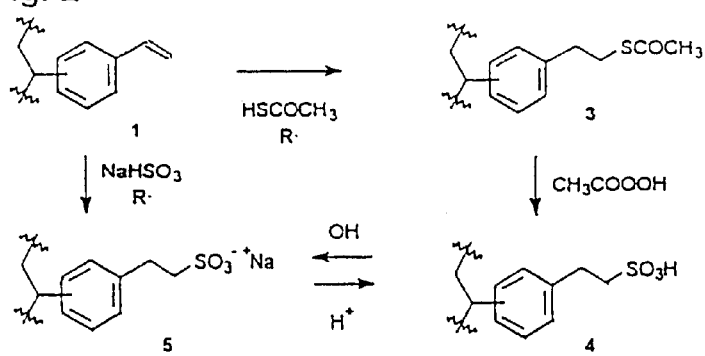
FIG. 2 shows formation of —CH[Ph—CH$_2$CH$_2$—X(O)$_m$R$^1_n$R$^2$]—CH$_2$— repeat units of embodiments of the invention 4 and 5 wherein X is S, m=2 and n=0: by addition of HX(O)$_m$R$^1_n$R$^2$ wherein X is S, m=2, n=0 and R$^2$ is O$^-$ to 1-(vinylphenyl)ethylene repeat units of 1 in the presence of free radicals (5); and by treating —CH[Ph—CH$_2$CH$_2$—X(O)$_m$R$^1_n$R$^2$]—CH$_2$— repeat units of 2 wherein X is S, m=0, n=0 and R$^2$ is COR$^3$ wherein R$^3$ is methyl, with peracetic acid so as to increase the oxidation state of X (4)
Figure 3:
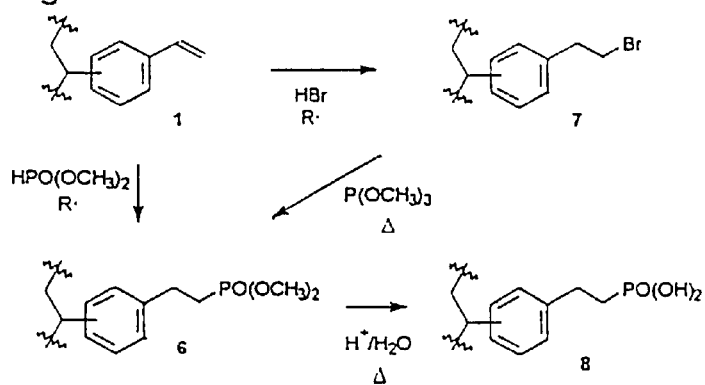
FIG. 3 shows formation of —CH[Ph—CH$_2$CH$_2$—X(O)$_m$R$^1_n$R$^2$]—CH$_2$— repeat units of an embodiment of the invention 6 wherein X is P, m=1, n=1 and R$^1$ and R$^2$ are OR$^3$ wherein R$^3$ is methyl, by addition of HX(O)$_m$R$^1_n$R$^2$ wherein X is P, m=1, n=1 and R$^1$ and R$^2$ are OR$^3$ wherein R$^3$ is methyl to polymeric 1-(vinylphenyl)ethylene repeat units of 1 in the presence of free radicals, or by reaction of trimethyl phosphite with polymeric —CH[Ph—CH$_2$CH$_2$—Br]—CH$_2$— repeat units of 7; formation of —CH[Ph—CH$_2$CH$_2$—X(O)$_m$R$^1_n$R$^2$]—CH$_2$— repeat units of an embodiment of the invention 8 wherein X is P, m=1, n=1 and R$^1$ and R$^2$ are OH, by treating polymeric repeat units of the form —CH[Ph—CH$_2$CH$_2$—X(O)$_m$R$^1_n$R$^2$]—CH$_2$— of 6 wherein X=P, m=1, n=1 and R$^1$ and R$^2$ are OR$^3$ wherein R$^3$ is methyl, with reagents so that R$^1$ is replaced by R$^{11}$ and R$^2$ is replaced by R$^{12}$, wherein both R$^{11}$ and R$^{12}$ are OH.

Generated through abstraction of H. from HX(O)$_m$R$^1_n$R$^2$ (wherein X is a nonmetal including sulfur and phosphorus) by initiator-derived R. or other intermediate radicals, the stability of radicals of general form .X(O)$_m$R$^1_n$R$^2$ falls within the range necessary to support a chain reaction in which HX(O)$_m$R$^1_n$R$^2$ is ultimately added to vinylaryl in anti-Markovnikov fashion to generate Ar—CH$_2$CH$_2$—X(O)$_m$R$^1_n$R$^2$, in which oxyacid functionalities X(O)$_m$R$^1_n$R$^2$ are connected to aryl via dimethylene spacers, that are linkages not subject to the chemical instabilities of shorter spacers. For vinylaryl small molecules, including styrene, this addition does not compete favourably with radical polymerization of the vinylaryl. However, vinylaryl groups that are already part of a crosslinked polymer, particularly those of the 1-(vinylphenyl)ethylene repeat units of a radical copolymer of divinylbenzene in which all polymer bound vinyls that were close to other vinyls have been consumed during its original polymerization, are site-isolated and so incapable of reaching other vinyls to react with under radical conditions, and so will remain available to react with HX(O)$_m$R$^1_n$R$^2$, to produce, through a method of the invention, oxyacid derivatives on dimethylene spacers in a functional polymer of the invention (see 1 to 2 in FIG. 1, 1 to 5 in FIG. 2 and Example 1, 1 to 6 in FIG. 3 and Example 2). Such additions typically occur at a temperature range that coincides with the steady decomposition of initiator AIBN into free radicals (e.g. ca. 80° C.; see 1 to 6 in FIG. 3 and Example 2); some additions may require higher temperatures to proceed, at which other initiators such as di-t-butyl peroxide are more suitable (e.g. ca. 120° C.; see 1 to 5 in FIG. 2 and Example 1). In general, sulfite and phosphite derivatives in which hydrogen is connected to heteroatom X are suitable for such radical additions.

In another method of the invention, stable and useful nonmetal oxyacid derivatives on dimethylene spacers in a functional polymer of the invention can be obtained by oxidation of other, precursor functional groups connected through the same nonmetal to dimethylene spacers, which precursor functional groups themselves have often been obtained by similar radical addition to polymeric 1-(vinylphenyl)ethylene repeat units. Some initial substituents on X such as hydrogen and acyl in such precursor functional groups, are themselves generally replaced by other substituents, through oxidation or hydrolysis, under the conditions of the oxidation of the precursor functional groups (e.g. see 2 to 4 in FIG. 2 and Example 1). Another method of the invention to obtain oxyacid derivatives on dimethylene spacers in a functional polymer of the invention, is to interconvert substituents of X without changing the oxidation state of X, typically through nucleophilic substitutions centered on X (e.g. see 6 to 8 in FIG. 3 and Example 2), or other reactions such as protonation or deprotonation of said substituents (e.g. see 5 to 4 and 4 to 5 in FIG. 2 and Example 1). Still other methods and reactions are also capable of producing oxyacid derivatives on dimethylene spacers in a functional polymer of the invention from other functional groups (e.g. see 7 to 6 in FIG. 3 and Example 2).

In any of the above reactions, excess of reagents may be used, and reaction continued, until maximum content of a particular oxyacid derivative on dimethylene spacer is obtained, even to 30 mol % or more of total polymeric repeat units when starting from polymer precursors having sufficient polymeric 1-(vinylphenyl)ethylene repeat units, such as certain poly(divinylbenzene) copolymers including commercial Amberlite® XAD-4, or other precursor functional groups; or a limited amount of reagent may be employed, or the reaction terminated early, and some polymeric precursor repeat units remain, which can either be left unreacted, or can be made to react in another method of the invention, or made to undergo some other reaction, either at the same or some later time. In particular, only a few oxyacid derivatives may be necessary on a functional polymer for application as a support for solid-phase synthesis of oligo- or polynucleotides, peptides, saccharides or other relatively large molecules. The radical addition, oxidation or substituent replacement methods of the invention may be pursued before, after or simultaneous with other modifications of a starting polymer. Also, oxyacid derivatives on dimethylene spacers that are embodiments of the invention, remain so regardless of whether they were prepared by these or other methods, from other oxyacid derivatives on dimethylene spacers that are also embodiments of the invention, or from other precursors that are not (e.g. 4 from 3 or 5, and 5 from 4 or 1, in FIG. 2 and Example 1; 6 from 1 or 7 in FIG. 3 and Example 2). In particular, oxyacid derivatives in which at least one of R$^1$ and R$^2$ is Cl, Br or OR, are particularly versatile intermediates towards other structures of the invention, being able to react with nucleophiles such as water, hydroxide, carboxylates, alcohols or amines, including polypeptides, polysaccharides or polynucleotides, to provide functional groups that are carboxylic acids, carboxylate salts, esters, amides, or (with actual or latent primary amines, and forcing conditions) imides, including supported polynucleotides, enzymes, antibodies or antigens, or combinations thereof (e.g. 6 to 8 in FIG. 3, Example 2). Such chemical modifications may also be complete or partial—for example, a polypeptide, polysaccharide or polynucleotide may need only be supported on a very small fraction of total repeat units to provide a useful solid-phase catalyst or agent for molecular recognition. In all these ways, a functional polymer of the invention bearing nonmetal oxyacid derivatives on dimethylene spacers may or may not comprise other nonmetal oxyacid derivatives on dimethylene spacers, and may or may not comprise other repeat units having other structures or functional groups, possibly contributing other desirable qualities of density, solvent wettability or permeability, dispersability, stabilization of magnetic or other loaded particles, buffering capacity, or other desirable qualities, or combinations thereof.

In the examples below, various qualities and utilities of several preferred embodiments the invention are also demonstrated: 4, 5 and 8 as ion exchange resins, 4 and 5 as solid-phase buffers for acid or base, 8 as a chelating resin, 6 as an intermediate. It is apparent that modifications and adaptations of these specifically described embodiments will occur to those skilled in the art; however, it is to be expressly understood that such modifications and adaptations are within the spirit and scope of the present invention.

EXAMPLES

The following examples describe preferred embodiments of the present invention. "Reagent-grade" solid and liquid chemicals were obtained from commercial suppliers, and used as received except where indicated. IR spectra of polymer samples ground into KBr were recorded using Bomem Michelson 100 (transmittance) and Bruker FT-88 (diffuse reflectance) FTIR spectrophotometers. $^{13}$C, $^{31}$P and $^{29}$Si CP/MAS (cross-polarization/magic angle spinning), as well as $^{13}$C CP-MAS-DD (cross-polarization/magic angle spinning/dipolar dephasing; dephasing time $\tau$=45 $\mu$s), solid-phase NMR spectra were obtained on a Chemagnetics Inc. 25.1 MHz M-100 spectrometer [Gao et al y1993, ibid]. Elemental analyses were done by Guelph Chemical Laboratories (ON, Canada) and Robertson Microlit Laboratories (N.J., USA), except for some sulfur analyses that were done on-site by a modified Schöninger flask method. Surface area measurements were done on a Quantchrome Quantasorb BET apparatus; swelling in toluene was volumetrically gauged on a sample in a small graduated cylinder. Polymer particles were generally collected from suspensions by filtration through 75 $\mu$m poly(tetrafluoroethylene) mesh (Spectrum Inc.).

Example 1

Functional polymer bearing sulfonic acid derivatives on dimethylene spacers (4, 5). Ps—$CH_2CH_2$—$SCOCH_3$ $(C_{10}H_{12})_{0.45}(C_{10}H_{10})_{0.32}(C_{10}H_{11}$—$SC_2H_3O)_{0.23}$ 3 (5.00 g, 8.5 mmol S), prepared by radical addition of $CH_3COSH$ to polymeric 1-(vinylphenyl)ethylene repeat units of poly (divinylbenzene) $(C_{10}H_{12})_{0.45}(C_{10}H_{10})_{0.20}(C_8H_7CH$=$CH_2)_{0.35}$ 1, was swollen with 6 mL toluene, then 40 mL of cold 32% wt. peracetic acid in acetic acid (190 mmol) was added slowly and stirred at room temperature 18 h, during which time the colour of suspended solid changed to yellow brown. The beads were then filtered and washed with toluene 3×, then ether 6× then dried in vacuo 24 h at 75° C. giving 5.43 of 4 as dark brown beads: FT-IR (KBr), 1206, 1175, 1040 $cm^{-1}$. Anal. Calc. for $(C_{10}H_{12})_{0.45}(C_{10}H_{10})_{0.33}$ $(C_{10}H_{11}$—$SO_3H)_{0.12}\cdot2.24H_2O$, C, 64.2; S, 2.29. Found C, 64.25; S, 2.28. Substantially identical product was obtained by heating 1 with excess sodium bisultfite and 1 mol % di-t-butyl peroxide dissolved in N-methylpyrrolidinone at 120° C. for 12 hours, yielding 5, followed by acidification with excess concentrated hydrochloric acid, yielding 4. 4 and 5 could be further interconverted by acids and bases in the manner of a strong acid ion exchange resin.

Example 2

Functional polymer bearing phosphonic acid derivatives on dimethylene spacers (6, 8). Poly(divinylbenzene) 1 $(C_{10}H_{12})_{0.45}(C_{10}H_{10})_{0.30}(C_8H_7CH$=$CH_2)_{0.25}$ (9.25 g, 17.6 mmol C=C) was swollen with 25 ml toluene and dimethylphosphite (8.00 mL, 87.2 mmol) and azobis (isobutyronitrile) (0.1 g, 0.6 mmol) were added, and the mixture heated at 70° C. under $N_2$ 48 h. The beads were filtered and resuspended and washed with toluene (4×) then ethanol (4×) then dried in vacuo at 70° C. 24 h, yielding 10.95 g of 6 as white beads: $^{31}$P solid-state NMR (100 MHz) $\delta$ 32.5 ppm; FT-IR (KBr) 1181, 1018 $cm^{-1}$. Anal. Calcd for $(C_{10}H_{12})_{0.45}(C_{10}H_{10})_{0.37}(C_{10}H_{10}$—$PC_2O_3H_{11})_{0.18}$ (72% conversion): P, 3.70. Found. P, 3.67. Substantially the same product was obtained by heating (bromoethyl)polystyrene 7, prepared by addition of hydrogen bromide across vinyl of polymeric 1-(vinylphenyl)ethylene repeat units of poly (divinylbenzene) 1, with trimethyl phosphite, followed by washing and drying. Refluxing with 1 $M/H_2SO_4/H_2O$ gave 8, which chelated $Co^{2+}$ in the presence of $Ni^{2+}$ at pH 2–3, which could afterwards be eluted with 1 N HCl; 8 also took up uranyl ions.

What is claimed is:

1. A functional polymer bearing nonmetal oxyacid derivatives on dimethylene spacers, comprising repeat units of the form —CH[Ph—$CH_2CH_2$—$X(O)_mR^1_nR^2$]—$CH_2$—, wherein X is selected from nonmetals S and P, m is selected from 2 with X=S, or from 1 with X=P, $R^1$ is selected from Cl, Br, O⁻, OH, $R^3$, $OR^3$, $NH_2$, $NHR^3$, $NR^3R^4$ and $NR^5R^6$ with X=P, n is selected from 0 with X=S, or from 1 with X=P, $R^2$ is selected from Cl, Br, O⁻, OH, $OR^7$, $NH_2$, $NHR^7$, $NR^7R^8$ and $NR^9R^{10}$, wherein $R^3$, $R^4$, $R^7$ and $R^8$ are selected from methyl, ethyl, n-propyl, i-propyl, n-butyl, i-butyl, s-butyl, t-butyl, 2-ethylhexyl, hexadecyl, 2-chloroethyl, 2-bromoethyl, 2,2,2-trifluoroethyl, 2-hydroxyethyl, 2-butoxyethyl, 2-aminoethyl, cyclohexyl, phenyl, benzyl, 4-nitrobenzyl, tolyl, a polypeptide, a polysaccharide and a polynucleotide, and $R^5$, $R^6$, $R^9$ and $R^{10}$ are selected from cyclic —$(CH_2)_q$— wherein q is selected from 2 to 5.

2. A functional polymer of claim 1, that is derived from a polymer comprising 1-(vinylphenyl)ethylene repeat units.

3. A functional polymer of claim 2, wherein said polymeric 1-(vinylphenyl)ethylene repeat units arise from copolymerization of a monomer mixture that includes divinylbenzene.

4. A functional polymer of claim 1, wherein X=S, m=2, n=0 and $R^2$ is selected from OH and O⁻.

5. A functional polymer of claim 1, wherein X=P, m=1, n=1 and $R^1$ and $R^2$ are selected from OH, O⁻ and $OCH_3$.

6. A method of preparing a functional polymer bearing nonmetal oxyacid derivatives on dimethylene spacers, wherein polymeric 1-(vinylphenyl)ethylene repeat units are treated with $HX(O)_mR^1_nR^2$ in the presence of free radicals, wherein X is selected from nonmetals S and P, m is selected from 2 with X=S, or from 1 with X=P, $R^1$ is selected from Cl, Br, O⁻, OH, $R^3$, $OR^3$, $NH_2$, $NHR^3$, $NR^3R^4$ and $NR^5R^6$ with X=P, n is selected from 0 with X=S, or from 1 with X=P, $R^2$ is selected from Cl, Br, O$^-$, OH, OR$^7$, NH$_2$, NHR$^7$, NR$^7$R$^8$ and NR$^9$R$^{10}$, wherein R$^3$, R$^4$, R$^7$ and R$^8$ are selected from methyl, ethyl, n-propyl, i-propyl, n-butyl, i-butyl, s-butyl, t-butyl, 2-ethylhexyl, hexadecyl, 2-chloroethyl, 2-bromoethyl, 2,2,2-trifluoroethyl, 2-hydroxyethyl, 2-butoxyethyl, 2-aminoethyl, cyclohexyl, phenyl, benzyl, 4-nitrobenzyl, tolyl, a polypeptide, a polysaccharide and a polynucleotide, and R$^5$, R$^6$, R$^9$ and R$^{10}$ are selected from cyclic —(CH$_2$)$_q$— wherein q is selected from 2 to 5.

7. A method of preparing a functional polymer bearing nonmetal oxyacid derivatives on dimethylene spacers, wherein polymeric repeat units of the form —CH[Ph—CH$_2$CH$_2$—X(O)$_m$R$^1_n$R$^2$]—CH$_2$— are treated with peracetic acid or other oxidizing agent so as to increase the oxidation state of X, wherein X is selected from nonmetals S and P, m is selected from 0 with X=S, or from 1 with X=P, $R^1$ is selected from H, Cl, Br, O$^-$, OH, R$^3$, OR$^3$, NH$_2$, NHR$^3$, NR$^3$R$^4$ and NR$^5$R$^6$ with X=P, n is selected from 0 with X=S, or from 1 with X=P, $R^2$ is selected from H, SO$_3^-$, C(NH$_2$)$_2^+$, CH(NMe$_2$)$^+$, C(CH$_3$)(NH$_2$)$^+$, CN, SH, and COR$^{11}$ with X=S, or from H, Cl, Br, O$^-$, OH, OR$^7$, NH$_2$, NHR$^7$, NR$^7$R$^8$ and NR$^9$R$^{10}$ with X=P, wherein R$^3$, R$^4$, R$^7$ and R$^8$ are selected from methyl, ethyl, n-propyl, i-propyl, n-butyl, i-butyl, s-butyl, t-butyl, 2-ethylhexyl, hexadecyl, 2-chloroethyl, 2-bromoethyl, 2,2,2-trifluoroethyl, 2-hydroxyethyl, 2-butoxyethyl, 2-aminoethyl, cyclohexyl, phenyl, benzyl, 4-nitrobenzyl, tolyl, a polypeptide, a polysaccharide and a polynucleotide, and R$^5$, R$^6$, R$^9$ and R$^{10}$ are selected from cyclic —(CH$_2$)$_q$— wherein q is selected from 2 to 5, and wherein $R^{11}$ is selected from hydrogen, methyl, ethyl, n-propyl, i-propyl, n-butyl, i-butyl, s-butyl, t-butyl, cyclohexyl, phenyl and tolyl.

8. A method of preparing a functional polymer bearing nonmetal oxyacid derivatives on dimethylene spacers, wherein polymeric repeat units of the form —CH[Ph—CH$_2$CH$_2$—X(O)$_m$R$^1_n$R$^2$]—CH$_2$— are treated with reagents so as to either replace $R^1$ by $R^{11}$, or $R^2$ by $R^{12}$, or both, wherein X is selected from nonmetals S and P, m is selected from 2 with X=S, or from 1 with X=P, $R^1$ and $R^{11}$ are selected from Cl, Br, O$^-$, OH, R$^3$, OR$^3$, NH$_2$, NHR$^3$, NR$^3$R$^4$ and NR$^5$R$^6$ with X=P, n is selected from 0 with X=S, or from 1 with X=P, $R^2$ and $R^{12}$ are selected from Cl, Br, O$^-$, OH, OR$^7$, NH$_2$, NHR$^7$, NR$^7$R$^8$ and NR$^9$R$^{10}$, wherein R$^3$, R$^4$, R$^7$ and R$^8$ are selected from methyl, ethyl, n-propyl, i-propyl, n-butyl, i-butyl, s-butyl, t-butyl, 2-ethylhexyl, hexadecyl, 2-chloroethyl, 2-bromoethyl, 2,2,2-trifluoroethyl, 2-hydroxyethyl, 2-butoxyethyl, 2-aminoethyl, cyclohexyl, phenyl, benzyl, 4-nitrobenzyl, tolyl, a polypeptide, a polysaccharide and a polynucleotide, and R$^5$, R$^6$, R$^9$ and R$^{10}$ are selected from cyclic —(CH$_2$)$_q$— wherein q is selected from 2 to 5.

* * * * *